(12) United States Patent
Yeleswarapu et al.

(10) Patent No.: US 8,799,172 B2
(45) Date of Patent: *Aug. 5, 2014

(54) USER DEVICE ADDING SECURE TOKEN TO NETWORK REQUESTS TO OBFUSCATE AN IDENTITY OF A USER TO A THIRD-PARTY PROVIDER

(71) Applicant: Cellco Partnership, Basking Ridge, NJ (US)

(72) Inventors: Chandrashekhar Yeleswarapu, Walnut Creek, CA (US); Brian Libonate, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,916

(22) Filed: Nov. 7, 2012

(65) Prior Publication Data

US 2014/0130145 A1    May 8, 2014

(51) Int. Cl.
*H04L 29/06*    (2006.01)
*H04L 29/12*    (2006.01)

(52) U.S. Cl.
CPC .................................... *H04L 61/30* (2013.01)
USPC .................. 705/74; 709/231; 713/168; 726/9

(58) Field of Classification Search
CPC ....................................................... H04L 61/30
USPC ............................................................. 726/9
See application file for complete search history.

(56) References Cited

U.S. PATENT DOCUMENTS

| | | | | |
|---|---|---|---|---|
| 5,245,656 | A * | 9/1993 | Loeb et al. | 713/154 |
| 6,976,090 | B2 * | 12/2005 | Ben-Shaul et al. | 709/246 |
| 7,551,913 | B1 * | 6/2009 | Chien | 455/411 |
| 2003/0233329 | A1 * | 12/2003 | Laraki et al. | 705/52 |
| 2004/0088349 | A1 * | 5/2004 | Beck et al. | 709/203 |
| 2007/0061575 | A1 | 3/2007 | Bennett | |
| 2008/0040226 | A1 * | 2/2008 | Roker | 705/14 |
| 2012/0151077 | A1 | 6/2012 | Finster | |
| 2013/0318346 | A1 * | 11/2013 | Libonate et al. | 713/168 |

OTHER PUBLICATIONS

WebView Android Developer, developer.android.com/reference/android/webkit/WebView.html, Oct. 1, 2012; 34 pages.
Wikipedia, "Single sign-on"; en.wikipedia.org/wiki/Single_sign-on; Sep. 27, 212; 5 pages.
Wikipedia, "WebKit"; en.wikipedia.org/wiki/Webkit; Oct. 2, 2012; 13 pages.

* cited by examiner

*Primary Examiner* — Hadi Armouche
*Assistant Examiner* — Bryan Wright (57) ABSTRACT

A user device is configured to receive a request to obtain a service, an application, or content from a provider; obtain, based on receiving the request, a token that may correspond to a user of the user device and may obfuscate an identity of the user to the provider; modify the request to include the token and to form a modified request; provide the modified request to the provider; receive, based on providing the modified request, information regarding the service, the application, or the content from the provider; and present the information for display on a display screen.

18 Claims, 9 Drawing Sheets

USER DEVICE ADDING SECURE TOKEN TO NETWORK REQUESTS TO OBFUSCATE AN IDENTITY OF A USER TO A THIRD-PARTY PROVIDER

BACKGROUND

Service provider networks transport network traffic associated with a variety of services, applications, and content. Over time, such networks transport more and more network traffic between user devices and content providers. Service provider networks have an interest in protecting identities of its users and/or safeguarding confidential information associated with the users.

DETAILED DESCRIPTION OF PREFERRED EMBODIMENTS

The following detailed description refers to the accompanying drawings. The same reference numbers in different drawings may identify the same or similar elements.

Systems and/or methods, described herein, may facilitate the provisioning of services, applications, and/or content to users while obfuscating the identities of the users to the providers of the services, applications, and/or content.

Figure 1:
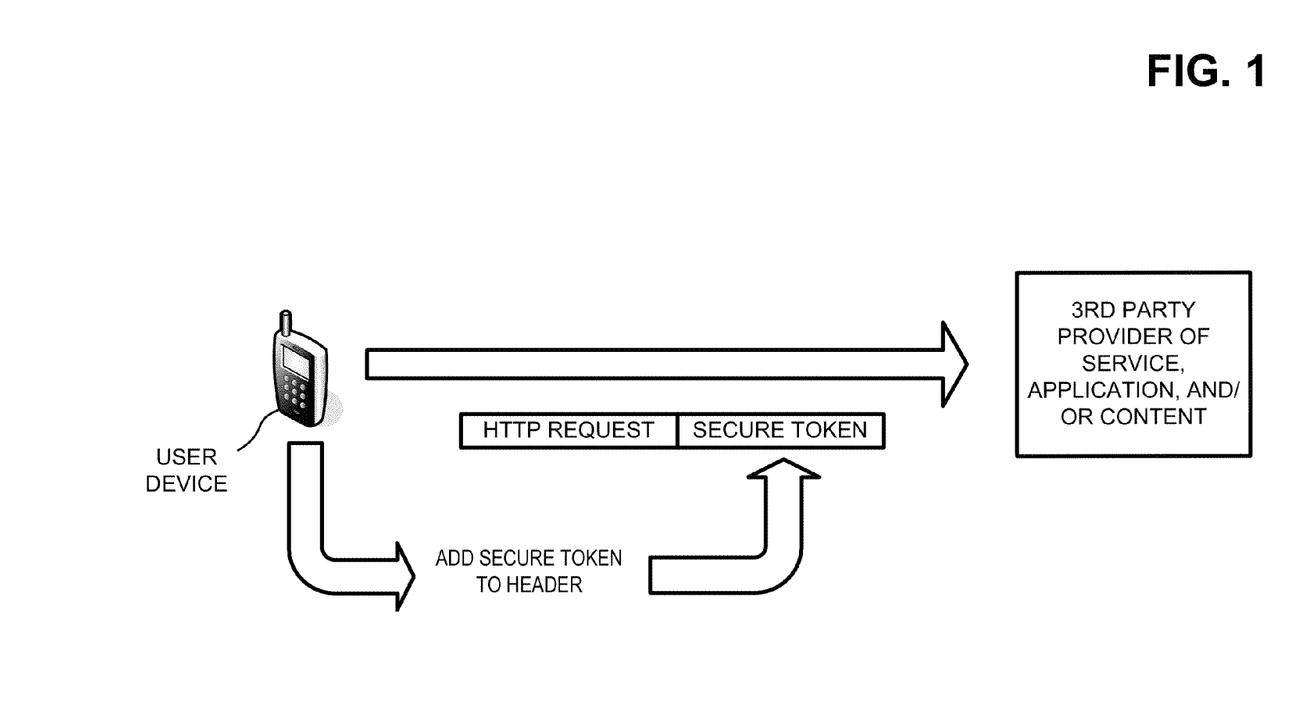
FIG. 1 is a diagram of an overview of an example implementation described herein.

FIG. 1 is a diagram of an overview of an example implementation described herein. As shown in FIG. 1, assume that a user, of a user device, desires to receive a service, an application, and/or content from a third party provider. The third party provider is a provider that is independent from a wireless service provider via which the user device receives service. In one example implementation, as shown in FIG. 1, the user device may generate a hypertext transfer protocol (HTTP) request that the user device may use to request the service, application, and/or content from the third party provider. In the example shown in FIG. 1, the user device may add a secure token to a header of the HTTP request to form a modified HTTP request. The secure token may encode an identifier associated with the user or the user device.

The user device may transmit the modified HTTP request to the third party provider. The third party provider may receive the modified HTTP request. The third party provider may analyze the modified HTTP request to identify the requested service, application, and/or content. Based on the secure token included in the modified HTTP request, the third party provider may initiate a particular process, such as a content targeting process (e.g., to target advertisements to the user), an authentication process (e.g., to authenticate the user), a billing process (e.g., to bill the user for the requested service, application, and/or content). The third party provider may provide the requested service, application, and/or content to the user device without the third party provider ever being aware of the identity of the user.

Figure 2:
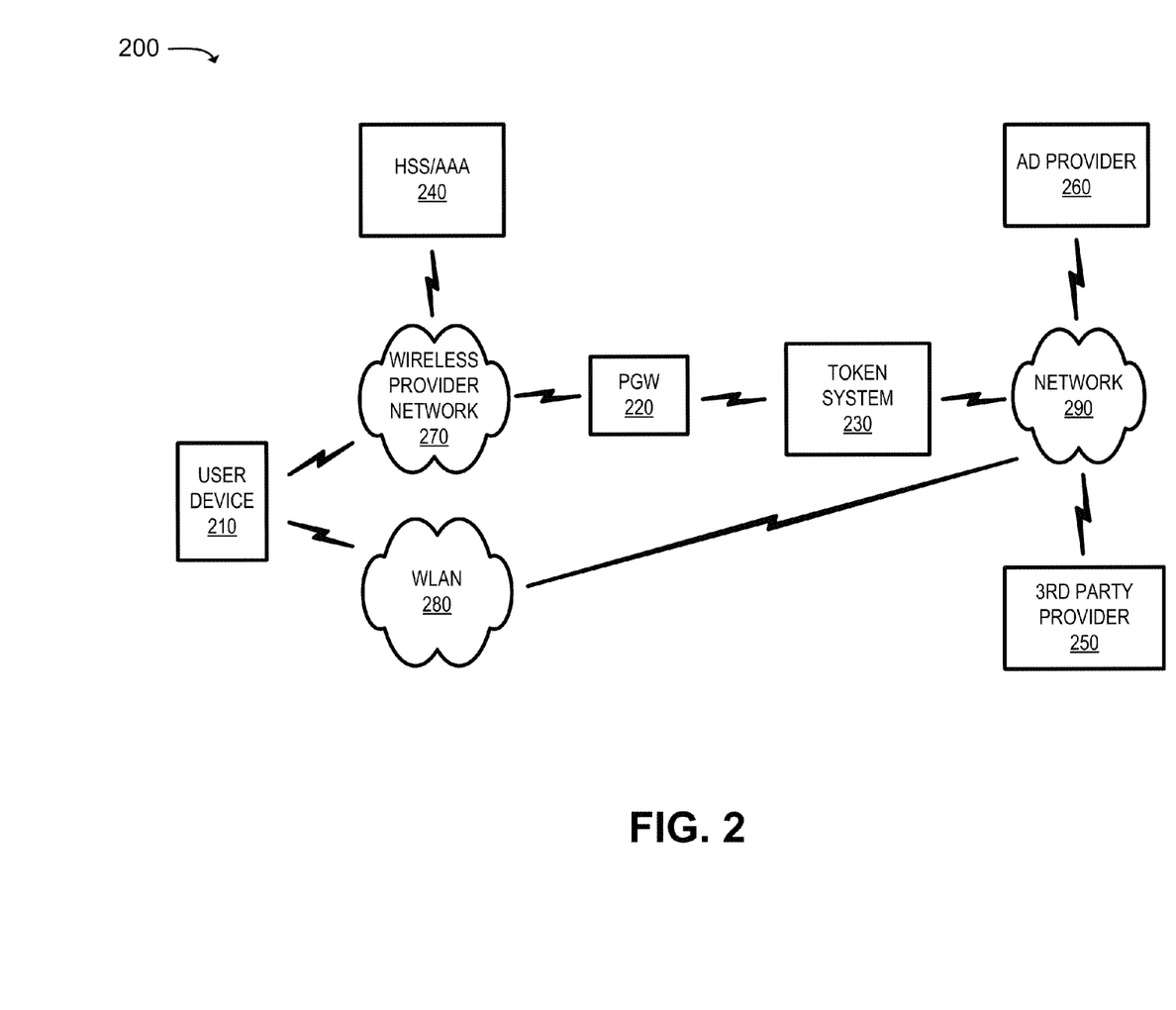
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a packet data network (PDN) gateway (PGW) 220 (hereinafter referred to as a "PGW 220"), a token system 230, a home user/authentication, authorization, and accounting server 240 (hereinafter referred to as a "HSS/AAA 240"), a third party provider 250, an advertising provider 260 (hereinafter referred to as "ad provider 260"), a wireless provider network 270, a WLAN 280, and a network 290.

User device 210 may include a communication device that is capable of communicating via wireless provider network 270 and WLAN 280. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a tablet computer, a personal gaming system, or another type of communication device. The description to follow will generally refer to user device 210 as a wireless mobile communication device. The description is not limited, however, to a wireless mobile communication device and may equally apply to other types of user devices.

PGW 220 may include one or more network devices that gather, process, search, store, and/or provide information in a manner described herein. For example, PGW 220 may include a gateway, a router, a switch, a firewall, a network interface card (NIC), a hub, a bridge, a proxy server, an optical add-drop multiplexer (OADM), or some other type of device (e.g., a home agent (HA)) that processes and/or transfers traffic.

In some implementations, PGW 220 may perform a network address translation (NAT) operation, for user device 210, when a request to communicate with network 290 is received from user device 210. Additionally, or alternatively, PGW 220 may obtain, from the request, information associated with a user of wireless provider network 270 and may communicate with HSS/AAA 240 to authenticate the user based on the information associated with the user.

Token system 230 may include one or more network devices that gather, process, search, store, and/or provide information in a manner described herein. For example, token system 230 may generate a secure token, for a user, based on an identifier associated with user device 210 or the user of user device 210. In some implementations, the identifier may correspond to a user identifier, such as a username, a password, an email address, a personal identification number (PIN), or the like. In some implementations, the identifier may correspond to a user device identifier, such as a mobile equipment identifier (MEID), an international mobile equipment identifier (IMEI), a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), or the like. In some implementations, the identifier may correspond to a combination of a user identifier and a user device identifier.

Token system 230 may subject the identifier to a cryptographic hash function (e.g., a message-digest algorithm (MDA), a secure hash algorithm (SHA), such as a hash-based message authentication code (HMAC) SHA, or the like) and/or some other mathematical function to generate the secure token. The secure token may be valid for a period of time, after which the secure token may no longer be used. Token system 230 may store the secure token and provide the secure token for secure storage by user device 210. In some implementations, token system 230 may provide an application programming interface (API) via which user device 210 may retrieve the secure token.

Token system 230 may also process requests for user authentication services. For example, token system 230 may register third party provider 250, application developers, etc. to receive user authentication services in exchange for a fee and/or other value. Token system 230 may receive, from third party provider 250, a request to authenticate an attribute associated with a user (e.g., an identity, an MDN, a billing address, payment information, etc.). Token system 230 may obtain a secure token from the request and may determine whether the secure token is valid (e.g., has not expired). When the secure token is valid, token system 230 may perform a look-up operation to identify a stored secure token that matches the received secure token. Token system 230 may retrieve an attribute associated with the stored secure token. Token system 230 may also, or alternatively, determine whether the retrieved attribute matches an attribute obtained from the request. Token system 230 may provide, to third party provider 250, a notification that the user is authenticated when the retrieved attribute matches the attribute obtained from the request. Token system 230 may provide, to third party provider 250, a notification that the user cannot be authenticated when the retrieved attribute does not match the attribute obtained from the request.

HSS/AAA 240 may include one or more server devices that gather, process, search, store, and/or provide information in a manner described herein. For example, HSS/AAA 240 may manage and/or store, in a memory associated with HSS/AAA 240, a user profile of a user associated with user device 210. The user profile may identify services for which the user has subscribed, applications used by the user, a usage history, user preferences, etc. The user profile may also, or alternatively, identify whether the user has authorized (e.g., opted in) or not authorized (e.g., opted out) some or all of the user profile to be used to obtain targeted content. Additionally, or alternatively, HSS/AAA 240 may perform AAA operations when registering user device 210 with wireless provider network 270. Additionally, or alternatively, HSS/AAA 240 may authenticate a user, associated with wireless provider network 270, based on information, associated with the user, received from PGW 220 and/or token system 230.

Third party provider 250 may include one or more server devices that provide any type or form of content. For example, third party provider 250 may provide video, audio, images, advertising content, web pages, text, data, or some combination thereof. Additionally, or alternatively, third party provider 250 may provide applications and/or services, such as games, scripts, messaging applications/services, banking applications/services, communication applications/services, etc. Third party provider 250 may communicate with a particular user device 210, being used by a user of wireless provider network 270, to perform electronic transactions to provide a good and/or a service in exchange for payment information from user device 210. Third party provider 250 may receive, from ad provider 260, targeted content, such as advertising content, that corresponds to a secure token and may provide, via the particular user device 210, the targeted content and/or other content to the user with which the secure token is associated.

Ad provider 260 may include one or more server devices that provide advertising content. Ad provider 260 may, for example, maintain targeted content, such as advertising content, that corresponds to secure tokens associated with users. Particular advertising content, corresponding to one or more secure tokens, may, for example, conform to attributes of the users with which the secure tokens are associated. Ad provider 260 may also, or alternatively, provide advertising content, to third party provider 250, that corresponds to a secure token received from third party provider 250.

Wireless provider network 270 may include one or more wired and/or wireless networks via which user devices 210 communicate and/or receive content. For example, wireless provider network 270 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, wireless provider network 270 may include a wide area network (WAN), a metropolitan area network (MAN), an ad hoc network, an intranet, a fiber optic-based network, and/or a combination of these or other types of networks.

WLAN 280 may include a local wireless network, such as a wireless fidelity (WiFi) network, a wireless distribution system, a wireless peer-to-peer network, or the like. As shown in FIG. 2, WLAN 280 may permit user device 210 to connect to network 290 without connecting via wireless provider network 270. In some implementations, WLAN 280 may be part of network 290.

Network 290 may include one or more wired and/or wireless networks. For example, network 290 may include a cellular network, the PLMN, a 2G network, a 3G network, a 4G network (e.g., a LTE network), a 5G network, and/or another network. Additionally, or alternatively, network 290 may include a WAN, a MAN, a telephone network (e.g., the Public Switched Telephone Network (PSTN)), an ad hoc network, an intranet, the Internet, a fiber optic-based network, and/or a combination of these or other types of networks.

The quantity of systems, devices, and/or networks, illustrated in FIG. 2, is provided for explanatory purposes only. In practice, there may be additional systems, devices and/or networks; fewer systems, devices, and/or networks; different systems, devices, and/or networks; or differently arranged systems, devices, and/or networks than illustrated in FIG. 2. For example, while FIG. 2 shows PGW 220, token system 230, and HSS/AAA server 240 as being located outside of wireless provider network 270, in practice, PGW 220, token system 230, and/or HSS/AAA server 240 may be network devices located in wireless provider network 270. Additionally, or alternatively, while FIG. 2 shows PGW 220 communicating with network 290 via token system 230, in practice, PGW 220 may communicate with network 290 without going through token system 230 and may communicate with token system 230 either directly or via one or more devices of wireless provider network 270 and/or network 290.

Also, in some implementations, one or more of the devices of environment 200 may perform one or more functions described as being performed by another one or more of the devices of environment 200. Systems, devices, and/or networks of environment 200 may interconnect via wired connections, wireless connections, or a combination of wired and wireless connections.

Figure 3:
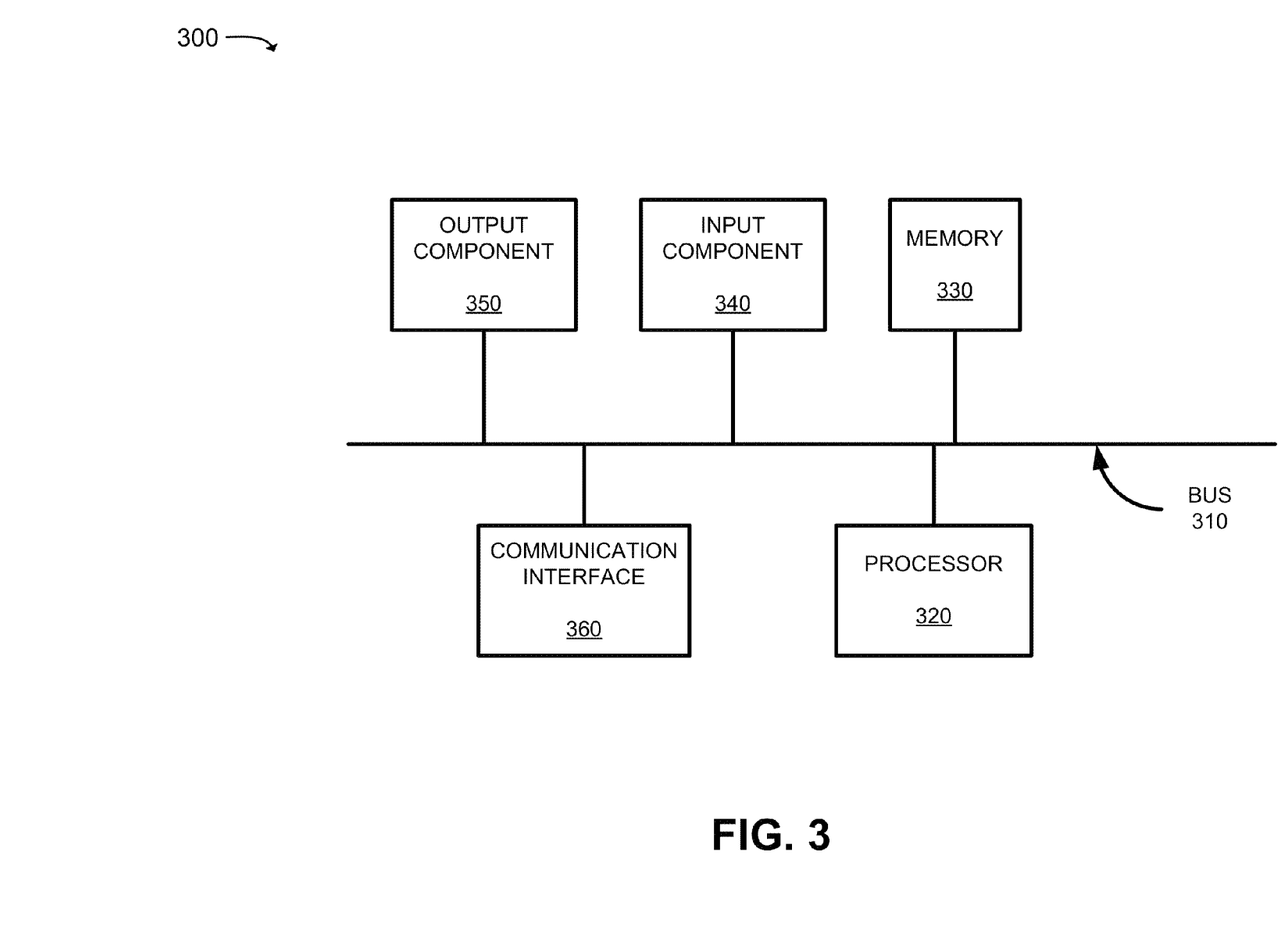
FIG. 3 is a diagram of example components of a device that may correspond to one or more of the devices in the environment of FIG. 2.

FIG. 3 is a diagram of example components of a device 300 that may correspond to user device 210, PGW 220, token system 230, HSS/AAA 240, third party provider 250, and/or ad provider 260. Alternatively, each of user device 210, PGW 220, token system 230, HSS/AAA 240, third party provider 250, and/or ad provider 260 may include one or more devices 300 and/or one or more components of device 300.

Device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., application specific integrated circuits (ASICs), field programmable gate arrays (FPGAs), etc.) that interprets and executes instructions. Memory 330 may include any type of dynamic storage device (e.g., random access memory (RAM)) that stores information and instructions for execution by processor 320, any type of non-volatile storage device (e.g., read only memory (ROM)) that stores information for use by processor 320, and/or any other type of storage device, such as a flash memory.

Input component 340 may include a component that permits a user to input information to device 300, such as a keyboard, a keypad, a button, a switch, etc. Output component 350 may include a component that outputs information to the user, such as a display, a speaker, a light emitting diodes (LED), etc.

Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include components for communicating with another device or system via a network, such as wireless provider network 270, WLAN 280, and/or network 290. In one implementation, communication interface 360 may be a logical component that includes input and output ports, input and output systems, and/or other input and output components that facilitate the transmission of data to other devices.

Device 300 may perform certain operations described herein. Device 300 may perform these operations in response to processor 320 executing software instructions contained in a computer-readable medium, such as memory 330. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4A:
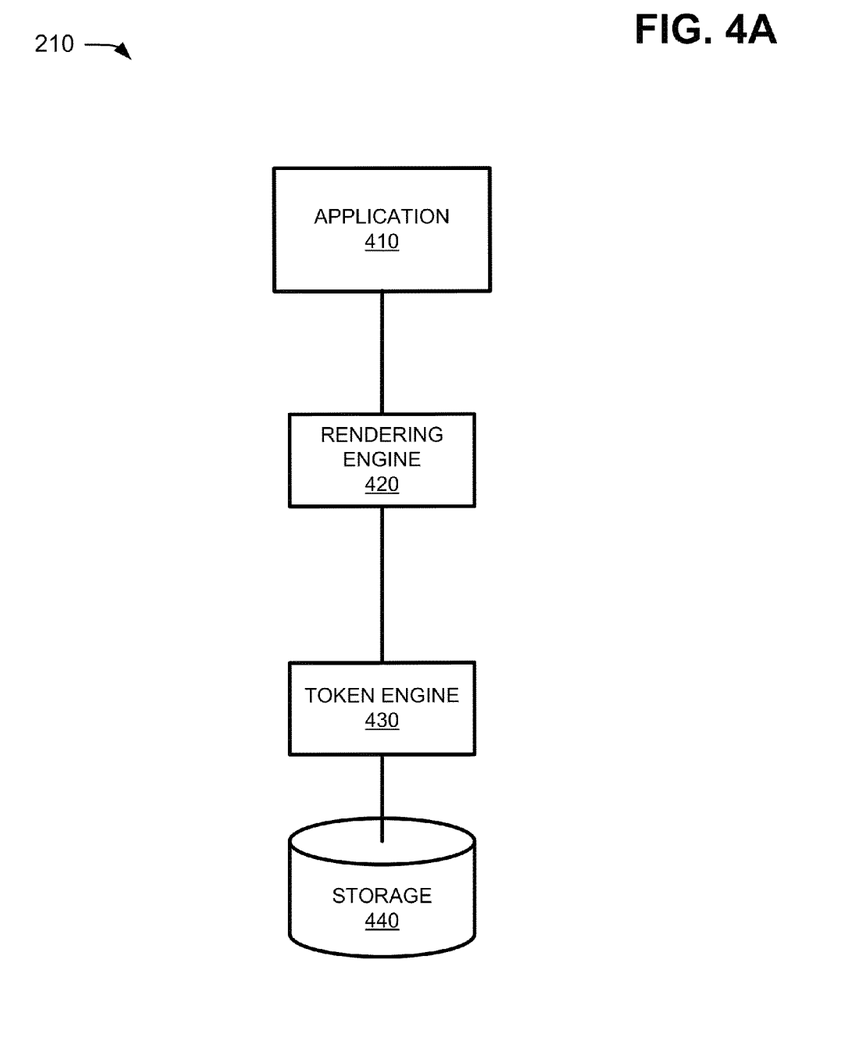
FIG. 4A is a diagram of example functional components of a user device according to some implementations.

FIG. 4A is a diagram of example functional components of user device 210 according to some implementations. As shown in FIG. 4A, user device 210 may include application 410, rendering engine 420, token engine 430, and storage 440.

Application 410 may include a program that interacts with an external device, such as third party provider 250. Some examples of application 410 include a browser application, a word processing application, a drawing application, a spreadsheet application, a messaging application, a communication application, and a presentation application. In some implementations, application 410 may communicate with third party provider 250 to receive and present content on a display screen associated with user device 210, to obtain a service from third party provider 250, and/or to purchase a product or service from third party provider 250.

Application 410 may generate a request. In some implementations, the request may take the form of an HTTP request. Application 410 may provide the request to rendering engine 420.

Rendering engine 420 may be responsible for presenting content on a display screen associated with user device 210. Rendering engine 420 has knowledge of the display screen size and the area of the display screen to use to render the content. In some implementations, rendering engine 420 may take the form of WebKit, which is a rendering engine designed to allow applications to render web pages. In some other implementations, rendering engine 420 may take the form of WebView, which is another rendering engine designed to render web content.

Rendering engine 420 may receive the request from application 410 and obtain the secure token associated with user device 210. To obtain the secure token, rendering engine 420 may output a request for the secure token to token engine 430. Rendering engine 420 may receive the secure token from token engine 430. Rendering engine 420 may modify the request with the secure token (e.g., insert the secure token into, or attach the secure token to, a portion of the request (e.g., a header, a trailer, or a payload)) to form a modified request, and may output the modified request to third party provider 250 via wireless provider network 270 or WLAN 280.

In some implementations, rendering engine 420 may modify the request (insert or attach the secure token) only when user device connects to WLAN 280. Thus, in these implementations, when user device 210 connects to wireless provider network 270, rendering engine 420 may not modify the request (not insert or attach the secure token), and may output the request to third party provider 250 via wireless provider network 270. In some other implementations, rendering engine 420 may modify the request with the secure token to form a modified request, and may output the modified request regardless of whether user device 210 connects to wireless provider network 270 or WLAN 280.

Token engine 430 may run on user device 210 as a service that has access to the inner layers of user device 210. Token engine 430 may store the secure token in storage 440. Token engine 430 may receive a request for the secure token from rendering engine 420 and, based on the request, may determine whether the secure token is stored in storage 440 and/or whether the secure token, stored in storage 440, is valid. If the secure token is not stored in storage 440 or the secure token, stored in storage 440, is invalid, token engine 430 may communicate with token system 230 to obtain the secure token.

Token engine 430 may have an API that communicates with token system 230 to obtain the secure token.

Storage 440 may correspond to secure memory space within user device 210. Storage 440 may store the secure token in a particular location in memory of user device 210.

The functional components, illustrated in FIG. 4A, are provided for explanatory purposes only. In practice, there may be additional functional components; fewer functional components; different functional components; or differently arranged functional components than illustrated in FIG. 4A. Also, in some implementations, one or more of the functional components of user device 210 may perform one or more functions described as being performed by another one or more of the functional components of user device 210. Also, or alternatively, two or more of the functional components of user device 210 may be implemented within a single device, and/or a single functional component of user device 210 may be implemented within two or more devices, which may be co-located or remotely located.

Figure 4B:
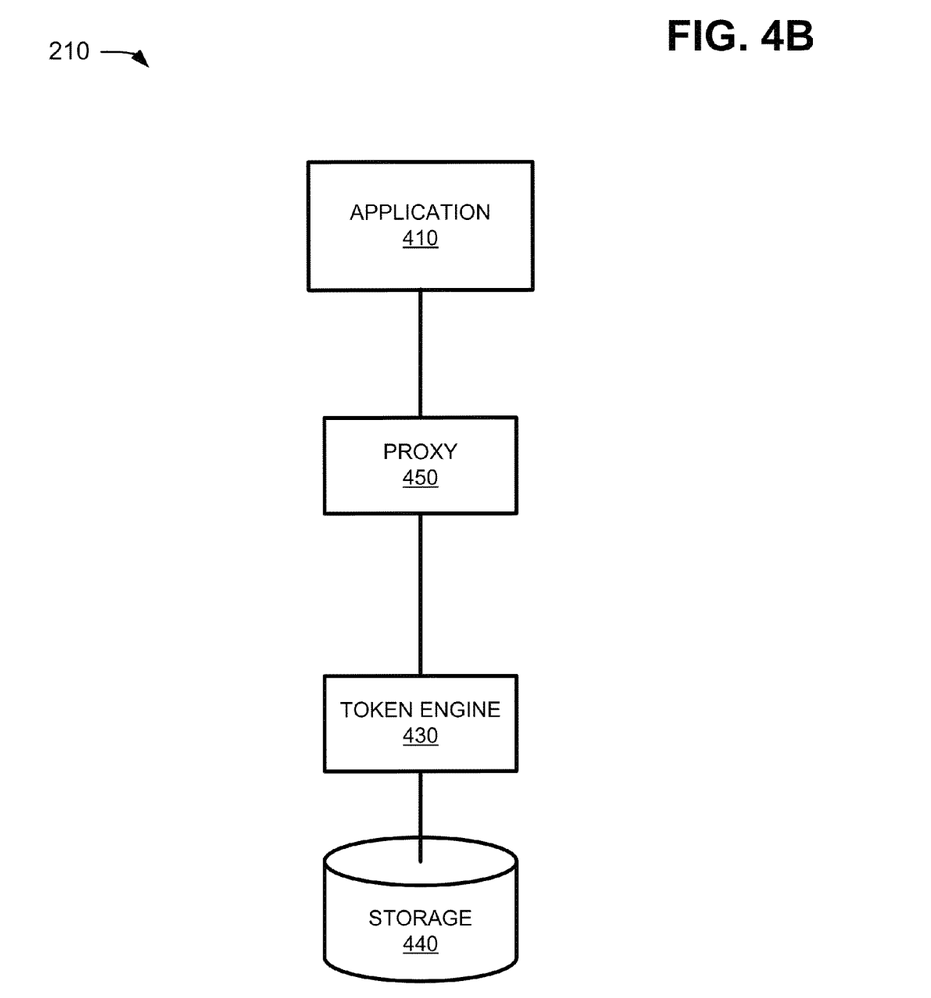
FIG. 4B is a diagram of example functional components of a user device according to some other implementations.

FIG. 4B is a diagram of example functional components of user device 210 according to some other implementations. As shown in FIG. 4B, user device 210 may include application 410, token engine 430, storage 440, and proxy 450. Application 410, token engine 430, and storage 440 may correspond to like functional components described with regard to FIG. 4A.

In some implementations, proxy 450 may take the form of proxy files stored on user device 210. Proxy 450 may receive the request from application 410 and obtain the secure token associated with user device 210. To obtain the secure token, proxy 450 may output a request for the secure token to token engine 430. Proxy 450 may receive the secure token from token engine 430. Proxy 450 may modify the request with the secure token (e.g., insert the secure token into, or attach the secure token to, a portion of the request (e.g., a header, a trailer, or a payload)) to form a modified request, and may output the modified request to third party provider 250 via wireless provider network 270 or WLAN 280.

In some implementations, proxy 450 may modify the request (insert or attach the secure token) only when user device connects to WLAN 280. Thus, in these implementations, when user device 210 connects to wireless provider network 270, proxy 450 may not modify the request (not insert or attach the secure token), and may output the request to third party provider 250 via wireless provider network 270. In some other implementations, proxy 450 may modify the request with the secure token to form a modified request, and may output the modified request regardless of whether user device 210 connects to wireless provider network 270 or WLAN 280.

The functional components, illustrated in FIG. 4B, are provided for explanatory purposes only. In practice, there may be additional functional components; fewer functional components; different functional components; or differently arranged functional components than illustrated in FIG. 4B. Also, in some implementations, one or more of the functional components of user device 210 may perform one or more functions described as being performed by another one or more of the functional components of user device 210. Also, or alternatively, two or more of the functional components of user device 210 may be implemented within a single device, and/or a single functional component of user device 210 may be implemented within two or more devices, which may be co-located or remotely located.

Figure 5:
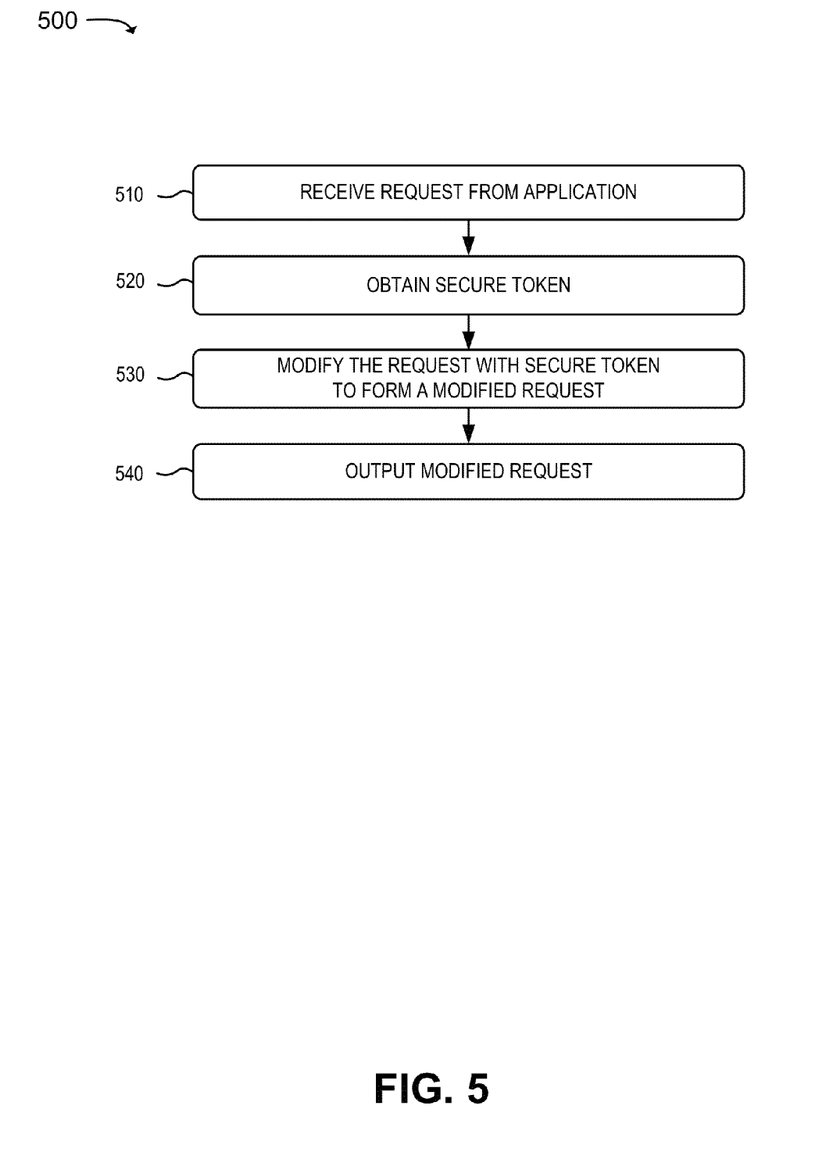
FIG. 5 is a flow chart of an example process for outputting a modified request.

FIG. 5 is a flow chart of an example process 500 for outputting a modified request. In one example implementation, process 500 may be performed by user device 210. In another example implementation, some or all of process 500 may be performed by a device or collection of devices separate from, or in combination with, user device 210, such as token system 230.

As shown in FIG. 5, process 500 may include receiving a request from an application (block 510). For example, an application 410, such as a browser application on user device 210, may generate a request to obtain a service, an application, and/or content in response to an instruction from a user of user device 210. Assume that a user desires to obtain content from a third party provider 250 (e.g., a particular website) by entering a URL, of third party provider 250, into a user interface of application 410. In some implementations, the request may take the form of an HTTP request. Depending on the implementation, as described above with regard to FIGS. 4A and 4B, application 410 may provide the request to rendering engine 420 (FIG. 4A) or proxy 450 (FIG. 4B). For the description to follow, assume that the implementation of FIG. 4A applies. With regard to the implementation of FIG. 4B, operations, described below as being performed by rendering engine 420, may be performed by proxy 450.

Process 500 may include obtaining a secure token (block 520). For example, rendering engine 420 may communicate with token engine 430 to obtain a secure token. Token engine 430 may determine whether a valid secure token is stored in storage 440. If the secure token is not stored in storage 440, token engine 430 may communicate with token system 230 to obtain the secure token, may store the secure token in storage 440, and may provide the secure token to rendering engine 420. If the secure token is already stored in storage 440, token engine 430 may determine whether the secure token, stored in storage 440, is valid. As explained above, a secure token may be valid for only a period of time. If the secure token is valid, token engine 430 may provide the secure token to rendering engine 420. If the secure token is no longer valid, token engine 430 may communicate with token system 230 to obtain a valid secure token, may store the valid secure token in storage 440, and may provide the valid secure token to rendering engine 420.

Process 500 may include modifying the request with the secure token to form a modified request (block 530). For example, in some implementations, rendering engine 420 may form the modified request by inserting the secure token into a portion of the request, such as into a header of the request, a trailer of the request, or a payload of the request. In some other implementations, rendering engine 420 may modify the request by attaching (e.g., adding) the secure token to a portion of the request, such as to a header of the request, a trailer of the request, or a payload of the request.

Process 500 may include outputting the modified request (block 540). For example, rendering engine 420 may transmit the modified request to third party provider 250 (e.g., a website server associated with the particular website) via wireless provider network 270 or WLAN 280. Third party provider 250 may receive the modified request and may obtain the content identified by the modified request.

Figure 6:
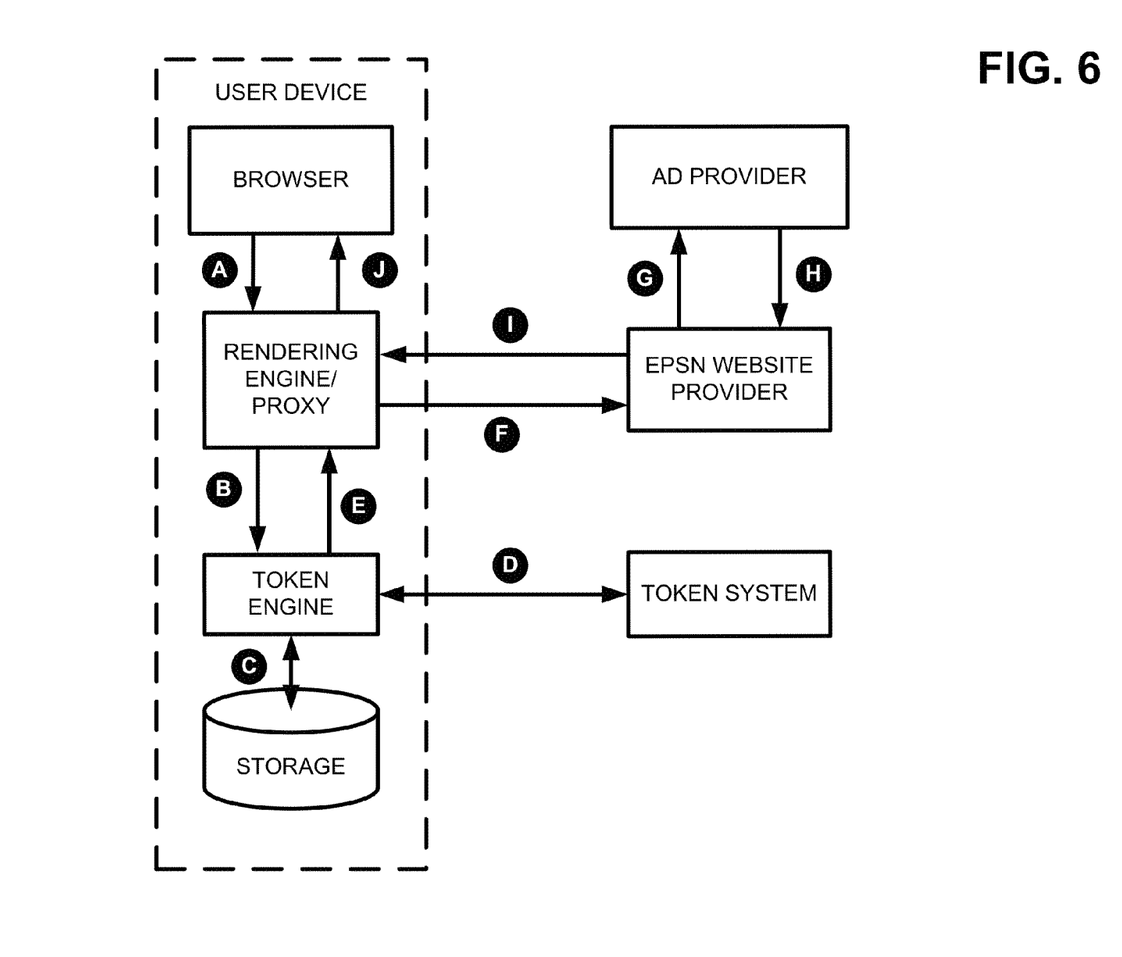
FIGS. 6-8 are diagrams of examples for forming and operating upon a modified request.

In some example implementations, as further described with regard to FIG. 6, third party provider 250 may read the secure token from the modified request and use the secure token to obtain targeted content. Third party provider 250 may transmit the requested content and the targeted content to user device 210. User device 210 may display the content and the targeted content on a display screen associated with user device 210.

Figure 7:
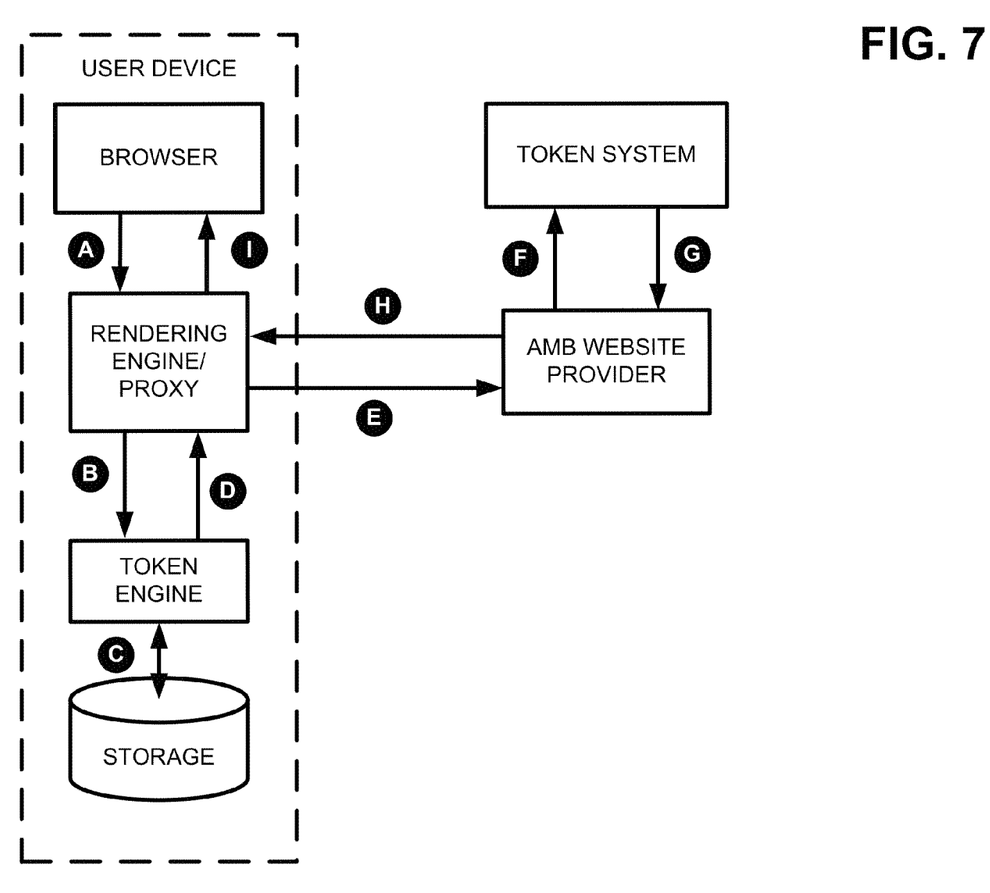

In some example implementations, as further described with regard to FIG. 7, third party provider 250 may read the secure token from the modified request and initiate an authentication process to authenticate the user or user device 210 associated with the modified request. Third party provider 250 may operate based on a result of the authentication process, and transmit the requested content to user device 210 when the authentication result indicates that the user or user device 210 is authenticated. User device 210 may display the content on a display screen associated with user device 210.

Figure 8:
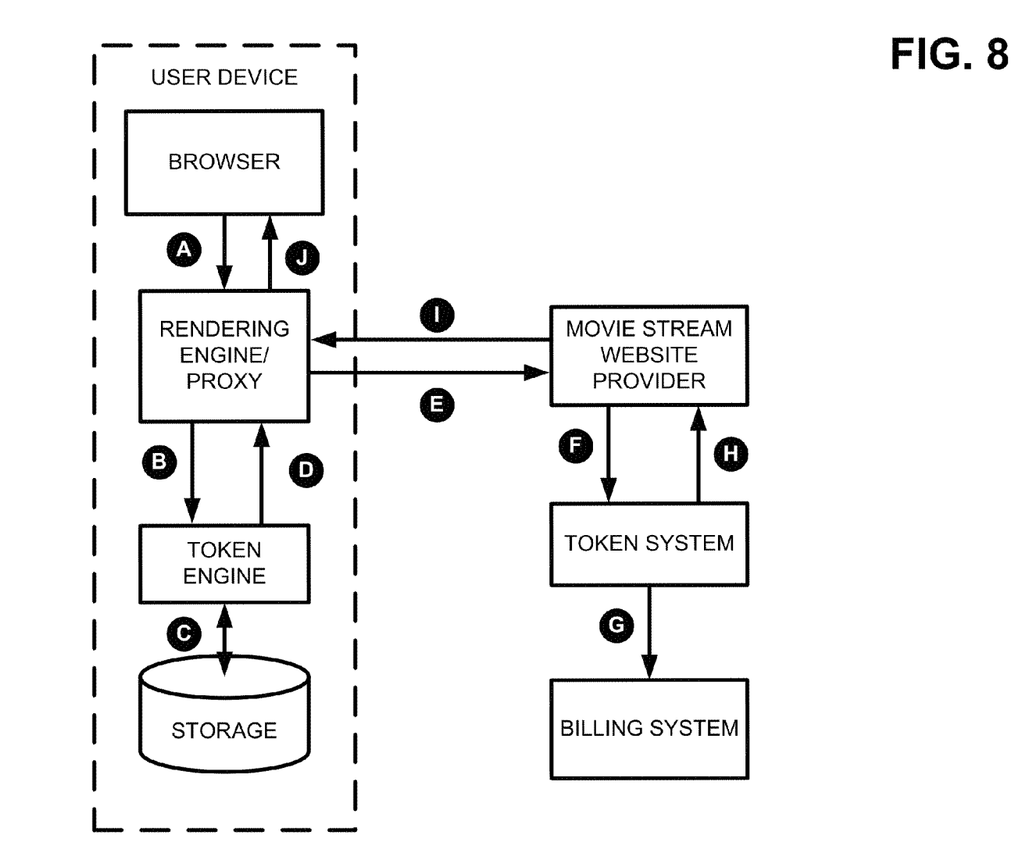

In some example implementations, as further described with regard to FIG. 8, third party provider 250 may read the secure token from the modified request and initiate a billing process. Third party provider 250 may operated based on a result of the billing process, and transmit the requested content to user device 210 when the billing result is successful. User device 210 may display the content on a display screen associated with user device 210.

The above-identified implementations are merely three use cases, which may occur separately or in combination. In other implementations, other use cases are possible.

While a series of blocks has been described with regard to FIG. 5, the blocks and/or the order of the blocks may be modified in other implementations. Further, non-dependent blocks may be performed in parallel.

For example, in some other implementations, user device 210 may modify a request to include the secure token only when user device 210 connects to WLAN 280—not when user device 210 connects to wireless provider network 270.

Additionally, or alternatively, in a situation where user device 210 connects to wireless provider network 270, in some implementations, token system 230 may receive the modified request from user device 210, and may modify the modified request to include the secure token (even though the modified request already includes the secure token) thereby forming a re-modified request. Token system 230 may provide the re-modified request to third party provider 250. Third party provider 250 may process the re-modified request by, for example, discarding one of the two instances of the secure token.

FIG. 6 is a diagram of an example for forming and operating upon a modified request. Assume, for this example, that the user device does not store a valid secure token in its storage. Further assume that a user, of the user device, desires to access a website associated with an EPSN website provider. In this case, the user opens a browser window, associated with a browser application on the user device, enters a URL of www.epsn.com for the EPSN website, and instructs the browser application to retrieve content associated with the EPSN website. In response, the browser application generates an HTTP request to obtain content from the EPSN website.

The browser application provides the HTTP request to the rendering engine or the proxy (hereinafter referred to as "rendering engine/proxy") (shown as (A) in FIG. 6). The rendering engine/proxy invokes an API, for the token engine, to obtain a secure token from the token engine (shown as (B) in FIG. 6). The token engine determines whether a valid secure token is stored in the storage (shown as (C) in FIG. 6). In this case, the token engine determines that a valid secure token is not stored in the storage. As a result, the token engine invokes an API, for the token system, to obtain the secure token from the token system (shown as (D) in FIG. 6).

The token engine provides the secure token to the rendering engine/proxy (shown as (E) in FIG. 6). The rendering engine/proxy modifies the HTTP request to include the secure token, thereby forming a modified HTTP request. The rendering engine/proxy sends the modified HTTP request to the EPSN website provider (shown as (F) in FIG. 6). The EPSN website provider analyzes the modified HTTP request, including the secure token included with the modified HTTP request. The EPSN website provider generates a request, for targeted content, and includes the secure token in the request. The EPSN website provider sends the request to the ad provider (shown as (G) in FIG. 6).

The ad provider receives the request, from EPSN website provider, and matches the secure token, obtained from the request, to a secure token that is stored in a memory associated with the ad provider. The ad provider retrieves, from memory, targeted content that corresponds to the stored secure token and provides the targeted content to the EPSN website provider (shown as (H) in FIG. 6). The EPSN website provider receives the targeted content and combines the content with the targeted content to create a response. The EPSN website provider transmits, as the response, the content and the targeted content to the user device (shown as (I) in FIG. 6). The rendering engine/proxy receives the response and provides the response to the browser application (shown as (J) in FIG. 6). The browser application receives the response and provides the response for display on a display screen associated with the user device.

FIG. 7 is a diagram of an example for forming and operating upon a modified request. Assume, for this example, that the user device stores a valid secure token in its storage. Further assume that a user, of the user device, desires to obtain content from a website associated with an AMB website provider. In this case, the user opens a browser window, associated with a browser application on the user device, enters a URL of www.amb.com for the AMB website, and instructs the browser application to retrieve content associated with the AMB website. In response, the browser application generates an HTTP request to obtain content from the AMB website.

The browser application provides the HTTP request to the rendering engine or the proxy (hereinafter referred to as "rendering engine/proxy") (shown as (A) in FIG. 7). The rendering engine/proxy invokes an API, for the token engine, to obtain a secure token from the token engine (shown as (B) in FIG. 7). The token engine determines whether a valid secure token is stored in the storage (shown as (C) in FIG. 7). In this case, the token engine determines that a valid secure token is stored in the storage. As a result, the token engine retrieves the secure token from the storage (shown as (C) in FIG. 7).

The token engine provides the secure token to the rendering engine/proxy (shown as (D) in FIG. 7). The rendering engine/proxy modifies the HTTP request to include the secure token, thereby forming a modified HTTP request. The rendering engine/proxy sends the modified HTTP request to the AMB website provider (shown as (E) in FIG. 7). The AMB website provider analyzes the modified HTTP request, including the secure token included with the modified HTTP request. To determine whether the user is a subscriber to the AMB website, the AMB website provider generates a request to authenticate the user or the user device, and includes the secure token in the request. The AMB website provider sends the request to the token system (shown as (F) in FIG. 7).

The token system receives the request, from the AMB website provider, and determines whether the user or the user device is a subscriber to the AMB website provider by, for example, comparing the secure token to a stored set of secure tokens associated with subscribers of the AMB website provider. The token system informs the AMB website provider of the authentication result (shown as (G) in FIG. 7). Assume that the authentication result indicates that the user or the user device is a subscriber to the AMB website. The AMB website provider receives the authentication result and creates a response based on the authentication result. The AMB provider transmits, as the response, a notification that the user has been authenticated and/or the requested content to the user device (shown as (H) in FIG. 7). The rendering engine/proxy receives the response and provides the response to the browser application (shown as (I) in FIG. 7). The browser application receives the response and provides the response for display on a display screen associated with the user device.

FIG. 8 is a diagram of an example for forming and operating upon a modified request. Assume, for this example, that the user device stores a valid secure token in its storage. Further assume that a user, of the user device, desires to purchase a video from a website associated with a movie stream website provider. In this case, the user opens a browser window, associated with a browser application on the user device, enters a URL of www.moviestream.com for the movie stream website, and instructs the browser application to retrieve content associated with the movie stream website. In response, the browser application generates an HTTP request to obtain content from the movie stream website.

The browser application provides the HTTP request to the rendering engine or the proxy (hereinafter referred to as "rendering engine/proxy") (shown as (A) in FIG. 8). The rendering engine/proxy invokes an API, for the token engine, to obtain a secure token from the token engine (shown as (B) in FIG. 8). The token engine determines whether a valid secure token is stored in the storage (shown as (C) in FIG. 8). In this case, the token engine determines that a valid secure token is stored in the storage. As a result, the token engine retrieves the secure token from the storage (shown as (C) in FIG. 8).

The token engine provides the secure token to the rendering engine/proxy (shown as (D) in FIG. 8). The rendering engine/proxy modifies the HTTP request to include the secure token, thereby forming a modified HTTP request. The rendering engine/proxy sends the modified HTTP request to the movie stream website provider (shown as (E) in FIG. 8). The movie stream website provider analyzes the modified HTTP request, including the secure token included with the modified HTTP request. Assume that the movie stream website provider wants to bill the user for the video before providing the video to the user device. In this case, the movie stream website provider generates a request to bill the user, and includes the secure token in the request. The movie stream website provider sends the request to the token system (shown as (F) in FIG. 8).

The token system receives the request, from the movie stream website provider, and determines that the request is associated with a request to bill the user for the video purchase from the movie stream website provider. The token system generates a billing request and sends the billing request to a billing system (shown as (G) in FIG. 8). The token system may map the secure token to an identifier for the user or the user device and send the identifier to the billing system with the billing request. In this case, the billing system may bill the user based on the identifier. Alternatively, the token system may send the secure token to the billing system with the billing request and the billing system may map the secure token to an identifier for the user or the user device and may bill the user based on the identifier.

The token system notifies the movie stream website provider that the user billing has been completed (shown as (H) in FIG. 8). The movie stream website provider receives the notification, from the token system, and creates a response that includes the requested video or a link to the requested video. The movie stream provider transmits the response to the user device (shown as (I) in FIG. 8). The rendering engine/proxy receives the response and provides the response to the browser application (shown as (J) in FIG. 8). The browser application receives the response and provides the response for display on a display screen associated with the user device.

Systems and/or methods, described herein, may enable a user device to insert a secure token into a request for a service, an application, and/or content. The secure token can then be used to provide the service, the application, and/or the content to a user, of the user device, while obfuscating the identity of the user. The user device may provide a modified request, which includes the secure token, to a third party provider to enable the third party provider to, for example, provide targeted content, authenticate the user, or bill the user, using the secure token and without knowing the identity of the user.

The foregoing description provides illustration and description, but is not intended to be exhaustive or to limit the implementations to the precise form disclosed. Modifications and variations are possible in light of the above implementations or may be acquired from practice of the embodiments.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and/or methods were described without reference to the specific software code—it being understood that software and control hardware can be designed to implement the systems and/or methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a user device, a request to obtain a service, an application, or content from a content provider,
   the request being received from an application executing on the user device;
   obtaining, by the user device and based on receiving the request, a token,
   the token being generated by a network service provider based on an identifier,
   the identifier being associated with at least one of the user device or a user of the user device, and
   the network service provider being different from the content provider, and the token obfuscating an identity of the user to the content provider;
determining, by the user device, whether the user device is connected to a wireless local area network or to a network associated with the network service provider;
selectively modifying, by the user device and based on whether the user device is connected to the wireless local area network or to the network associated with the network service provider, the request to include the token,
the request not being modified when the user device is connected to the network associated with the network service provider;
providing, by the user device, the request to the content provider,
the content provider providing the token to the network service provider to authenticate the user when the request is modified to include the token,
the user being authenticated without the identity of the user being provided to the content provider;
receiving, by the user device and based on providing the request, information regarding the service, the application, or the content from the content provider; and
providing, by the user device, the information to the application,
the application providing the information for display, to the user, on a display screen associated with the user device.

2. The method of claim 1, further comprising:
requesting the token from the network service provider,
the token being requested prior to receiving the request from the application;
receiving the token; and
storing the token in a secure storage location in the user device; and
where obtaining the token includes:
reading the token from the secure storage location.

3. The method of claim 2, where obtaining the token further includes:
determining that the token is not valid; and
contacting a network device of the network service provider to obtain a valid token based on the token not being valid.

4. The method of claim 1, where obtaining the token includes:
contacting a network device to obtain the token.

5. The method of claim 1, where the network service provider generates the token based on encrypting the identifier.

6. The method of claim 1, where the request is a hypertext transfer protocol (HTTP) request, and
where selectively modifying the request to include the token includes:
inserting the token into a header field of the HTTP request when
the user device is connected to the wireless local area network.

7. A user device, comprising:
a memory to store a token,
the token being generated by a wireless service provider providing wireless service to the user device,
the token being generated based on an identifier,
the identifier being associated with at least one of the user device or a user of the user device, and
the token obfuscating an identity of the user; and
receiving, by a processor, from an application executing on the user device, a request to obtain a service, an application, or content from a content provider,
the content provider being independent of the wireless service provider,
retrieving, by the processor, based on receiving the request, the token from the memory,
determining, by the processor whether the user device is connected to a wireless local area network or to a network associated with the wireless service provider,
selectively modifying, by the processor, based on whether the user device is connected to the wireless local area network or to the network associated with the wireless service provider, the request to include the token,
the request not being modified when the user device is connected to the network associated with the wireless service provider,
providing, by the processor, the request to the content provider,
the content provider authenticating the user by providing the token to the wireless service provider when the request is modified to include the token,
receiving, by the processor, based on providing the request, information regarding the service, the application, or the content from the content provider, and
providing, by the processor, the information to the application,
the application providing the information for display, to the user, on a display screen associated with the user device.

8. The user device of claim 7, wherein the processor receives the token from the wireless service provider prior to receiving the request and stores the token in a secure storage location in the memory,
and where the processor, when retrieving the token, retrieves the token from the secure storage location.

9. The user device of claim 7, where the processor is further to:
determine that the token is not valid, and
contact a network device, associated with the wireless service provider, to obtain a valid token based on determining that the token is not valid.

10. The user device of claim 7, where the processor, when retrieving the token, is to:
contact a network device, associated with the wireless service provider, to obtain the token,
store the token in the memory, and
retrieve the stored token from the memory.

11. The user device of claim 7, where the wireless service provider generates the token based on encrypting the identifier.

12. The user device of claim 7, where the request is a hypertext transfer protocol (HTTP) request, and
where the processor, when selectively modifying the request to include the token attaches the token as a header of the HTTP request when the user device is connected to the wireless local area network.

13. A non-transitory computer-readable medium storing instructions, the instructions comprising:
one or more instructions which, when executed by one or more processors of a user device that obtains service from a first provider, cause the one or more processors to:
receive, from an application executing on the user device, a request to obtain a service, an application, or content from a second provider,
the second provider being different from the first provider;
obtain, based on receiving the request, a token, the token being generated by the first provider based on an identifier,
the identifier being associated with at least one of the user device or a user of the user device, and
the token obfuscating an identity of the user to the second provider;
determine whether the user device is connected to a wireless local area network or to a network associated with the first provider;
selectively modify the request to include the token based on whether the user device is connected to the wireless local area network or the network associated with the first provider,
the request not being modified when the user device is connected to the network associated with the first provider;
provide the request to the second provider,
when the request is modified to include the token, the second provider providing the token to the first provider to determine whether to provide the service, the application, or the content;
receive, based on providing the request, information regarding the service, the application, or the content from the second provider; and
provide the information to the application,
the application providing the information for display, to the user, on a display screen associated with the user device.

14. The non-transitory computer-readable medium of claim 13, where the instructions further comprise:
one or more instructions which, when executed by the one or more processors, cause the one or more processors to:
receive the token from the first provider; and
store the token in a secure storage location in the user device; and
where the one or more instructions to obtain the token include:
one or more instructions which, when executed by the one or more processors, cause the one or more processors to:
obtain the token from the secure storage location.

15. The non-transitory computer-readable medium of claim 13, where the instructions further comprise:
one or more instructions which, when executed by the one or more processors, cause the one or more processors to:
determine that the token is not valid; and
contact a network device, associated with the first provider, to obtain a valid token based on the token not being valid.

16. The non-transitory computer-readable medium of claim 13, where the one or more instructions to obtain the token include:
one or more instructions which, when executed by the one or more processors, cause the one or more processors to:
request, from a network device, associated with the first provider, the token, and
receive the token from the network device.

17. The non-transitory computer-readable medium of claim 13, where the request is a hypertext transfer protocol (HTTP) request, and
where the one or more instructions to selectively modify the request to include the token include:
one or more instructions which, when executed by the one or more processors, cause the one or more processors to:
insert the token into a header of the HTTP request when the user device is connected to the wireless local area network.

18. The non-transitory computer-readable medium of claim 13, where the one or more instructions to obtain the token include:
one or more instructions which, when executed by the one or more processors, cause the one or more processors to:
request, from a network device, associated with the first provider, the token,
the token being requested prior to receiving the request from the application, and
receive the token from the network device.

* * * * *